DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MAY 19, 1970

874 O.G. 698

T874,010

SUPERSENSITIZED SILVER HALIDE PHOTOGRAPHIC EMULSIONS

Cynthia G. Ulbing, Fairport, and Mary Jane W. Brizee, Pittsford, N.Y. (both of Kodak Park, Rochester, N.Y. 14650)

Filed Dec. 12, 1969, Ser. No. 884,746
**Int. Cl. G03c *1/28***
U.S. Cl. 96—104
No Drawing. 18 Pages Specification

Photographic silver halide emulsions containing a sensitizing dye combination comprising (1) a benzimidazolo-oxacarbocyanine dye and (2) a benzimidazoloselenacarbocyanine dye which extends the sensitivity of the emulsion into the minus blue region of the spectrum. Preferred dye combinations include those represented by (1) a dye having the formula:

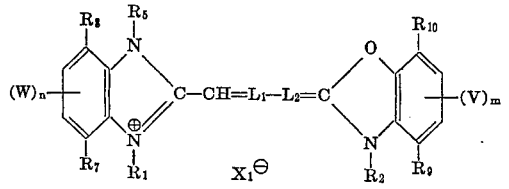

and (2) a dye having the formula:

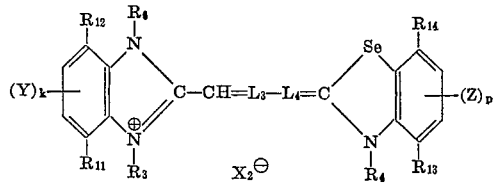

wherein *n, m, k* and *p* each represents a positive integer of from 1 to 2; $R_1$, $R_2$, $R_3$ and $R_4$ each represents an alkyl group; $R_5$ and $R_6$ each represents an unsubstituted lower alkyl group; $R_7$, $R_8$, $R_9$, $R_{10}$, $R_{11}$, $R_{12}$, $R_{13}$ and $R_{14}$ each represents a member selected from the group consisting of a hydrogen atom and a halogen atom; $X_1$ and $X_2$ each represents an acid anion; V and Z each represents a member selected from the group consisting of a hydrogen atom, a halogen atom, an alkyl group, an alkoxy group and an aryl group; $L_1$, $L_2$, $L_3$ and $L_4$ each represents a methine linkage; and W and Y each represents a member selected from the group consisting of a hydrogen atom, a halogen atom, a cyano group, an unsubstituted alkyl group, an alkoxy group, an acyl group of a monobasic fatty acid, an alkylaminocarbonyl group, a trifluoroalkyl group and a trifluoroalkylsulfonyl group.